Mar. 6, 1923.
J. B. TURNER
ENGINE STARTER
Filed Feb. 10, 1921
1,447,446
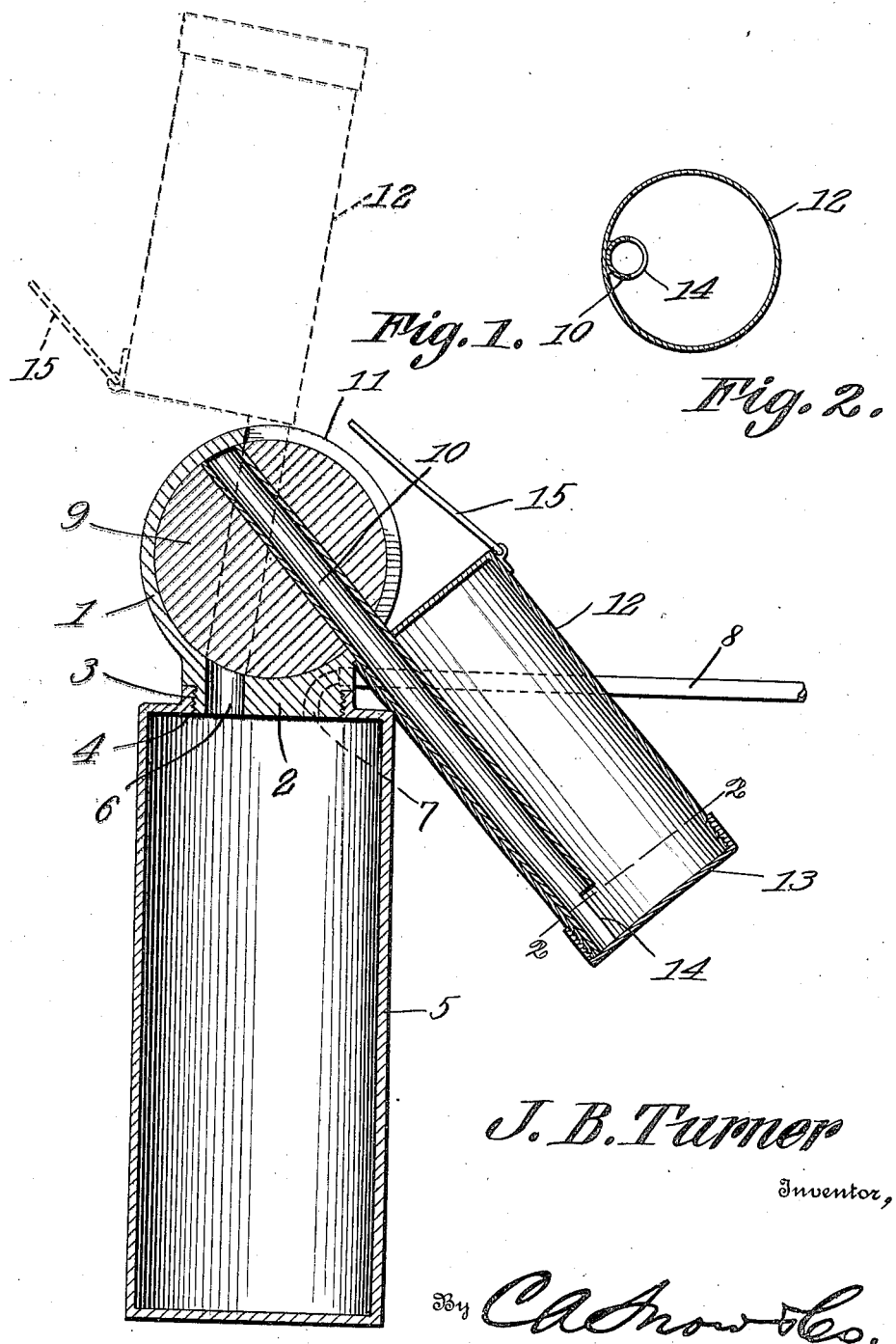

Patented Mar. 6, 1923.

1,447,446

UNITED STATES PATENT OFFICE.

JOHN B. TURNER, OF FORT SMITH, ARKANSAS.

ENGINE STARTER.

Application filed February 10, 1921. Serial No. 443,881.

*To all whom it may concern:*

Be it known that I, JOHN B. TURNER, a citizen of the United States, residing at Fort Smith, in the county of Sebastian and State of Arkansas, have invented a new and useful Engine Starter, of which the following is a specification.

This invention relates to a starter for explosive engines such as used, for example, on motor vehicles, one of its objects being to provide means whereby a small amount of acetylene can be generated when desired and directed into the cylinder of the engine where it will be exploded and impart the initial impulse to the piston.

A further object is to provide a structure of this character which can be installed readily and which will accurately measure the carbide and direct it into a water container at the will of the operator.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a section through the starter, one of the positions of the carbide container being indicated by dotted lines.

Figure 2 is a section on line 2—2, Figure 1.

Referring to the figures by characters of reference 1 designates a casing having a downwardly extending boss 2 provided with exterior screw threads 3 and this threaded boss is detachably engaged by the threaded mouth 4 at the upper end of a water container 5 constituting the generating chamber of the apparatus. A supply opening 6 extends through the boss from the interior of the casing 1 and opens into the container 5 while a gas outlet port 7 extends through the boss from the container and opens into a distributing pipe 8 whereby gas is directed to the intake manifold of the engine to be started.

A cylinder 9 is mounted for rotation in the casing 1 and extending through this cylinder is a tubular conductor 10 one end portion of which projects through a slot 11 in the wall of the casing and extending partly therearound. The projecting end of the conductor 10 extends into a carbide holder 12 which has a removable cap 13, the outer end of this conductor terminating close to the cap and having a portion of its wall cut away to provide a measuring opening as indicated at 14. An actuating rod 15 is connected to that end of the holder 12 nearest the casing 3 and is adapted to extend to the dash board of the vehicle or to some other point where it can be reached conveniently by the operator.

The container 5 is adapted to hold water while the holder 12 contains a supply of carbide. This holder is normally positioned as shown in Figure 1 and the carbide will naturally gravitate to the lower portion of the holder and enter the lower portion of the conductor 10 through the opening 14 so that a measured quantity of carbide will thus lie in the conductor 10. To start the engine the operator pulls on the rod 15 and this causes the holder 12 to swing upwardly to the position shown by dotted lines in Figure 1, at the same time rotating the cylinder 9 and bringing the conductor 10 against one end of the slot 11 and into register with the outlet opening 6. Accordingly the measured quantity of carbide will gravitate into the container 5 and into the water therein so that acetylene will be generated and will flow to the pipe 8. When the holder 12 is swung back to its normal position, which action takes place immediately after the delivery of carbide, the opening 6 is closed and a new quantity of carbide is measured into the lower end of the conductor 10 as will be obvious.

The container 5 can be easily removed for the purpose of cleaning and by detaching the cap 13 the holder 12 and conductor 10 can also be cleaned readily.

What is claimed is:—

A device of the class described including a slotted casing having a carbide passage therethrough and a gas port, a cylinder revoluble in the casing and normally closing the passage, a water container connected to the casing and communicating with the passage and gas port, a carbide holder, a tubular conductor extending through the cylinder and longitudinally within the holder, said conductor being normally positioned to receive a measured portion of carbide from the holder, and means for actuating the holder to rotate the cylinder and swing the conductor within the slot into register with the passage.

In testimony that I claim the foregoing as my own, I have hereto affixed my signature in the presence of two witnesses.

JOHN B. TURNER.

Witnesses:
VIRGIL TUNNELL,
LEOTA C. PETTIGREW.